(12) United States Patent
Martin

(10) Patent No.: US 8,170,088 B2
(45) Date of Patent: *May 1, 2012

(54) METHODS FOR DETERMINING A REFERENCE SIGNAL AT ANY LOCATION ALONG A TRANSMISSION MEDIA

(75) Inventor: G. Patrick Martin, Merritt Island, FL (US)

(73) Assignee: Harris Corporation, Melbourne, FL (US)

(*) Notice: Subject to any disclaimer, the term of this patent is extended or adjusted under 35 U.S.C. 154(b) by 809 days.

This patent is subject to a terminal disclaimer.

(21) Appl. No.: 12/273,797

(22) Filed: Nov. 19, 2008

(65) Prior Publication Data

US 2010/0124302 A1 May 20, 2010

(51) Int. Cl.
*H04B 3/46* (2006.01)
(52) U.S. Cl. ....................................... 375/224
(58) Field of Classification Search ................... 375/224
See application file for complete search history.

(56) References Cited

U.S. PATENT DOCUMENTS

| | | | |
|---|---|---|---|
| 3,646,558 A | 2/1972 | Campanella | |
| 3,697,997 A | 10/1972 | Cooper | |
| 3,961,172 A | 6/1976 | Hutcheon | |
| 4,060,809 A | 11/1977 | Baghdady | |
| 4,358,822 A | 11/1982 | Sanchez | |
| 4,532,518 A | 7/1985 | Gaglione et al. | |
| 4,843,397 A | 6/1989 | Galati et al. | |
| 4,862,180 A | 8/1989 | Martin | |
| 5,008,680 A | 4/1991 | Willey et al. | |
| 5,157,404 A | 10/1992 | Rowe et al. | |
| 5,227,736 A * | 7/1993 | Tucker et al. .............. | 330/149 |

(Continued)

FOREIGN PATENT DOCUMENTS

EP 0959522 A1 11/1999
(Continued)

OTHER PUBLICATIONS

Vavrda, M., "Digital Beamforming in Wireless Communications" Institute of Radio Electronics, Faculty of Electrical Engineering of Technology; Brno Univ. of Technology, Purkynova 118, Czech Republic; downloaded from the internet on Oct. 13, 2010 at <<http://www.urel.feec.vutbr.cz/ra2007/archive/ra2004/abstracts/110.pdf>>.

(Continued)

*Primary Examiner* — Juan A Torres
(74) *Attorney, Agent, or Firm* — Fox Rothschild, LLP; Robert J. Sacco

(57) ABSTRACT

Methods (200, 300) for determining a reference signal ($V_{ref}$). The methods involve (202, 204, 302, 304) sensing at a first location along the transmission media (108, 502) a first signal ($V_f$) propagated thereover in a forward direction and a second signal ($V_r$) propagated thereover in a reverse direction opposed from the forward direction. The second signal being a reflected version of the first signal. A sum signal (S) is determined (206, 306) by adding the first and second signals together. A difference signal (D) is determined (208, 308) by subtracting the second signal from the first signal. Thereafter, a first exponentiation signal ($E_S$) is determined (210, 310) using S. A second exponentiation signal ($E_D$) is determined (212, 312) using D. The first exponentiation signal is subtracted (214, 314) from the second exponentiation signal to obtain a reference signal ($V_{ref}$). $V_{ref}$ can be determined at any location along the transmission media. $V_{ref}$ can be used to control the phases and/or amplitudes of communication signals.

20 Claims, 10 Drawing Sheets

U.S. PATENT DOCUMENTS

| | | | |
|---|---|---|---|
| 5,313,308 A | 5/1994 | Hasegawa et al. | |
| 5,541,607 A | 7/1996 | Reinhardt | |
| 5,629,709 A | 5/1997 | Yamashita | |
| 5,698,848 A * | 12/1997 | Belk | 250/227.11 |
| 5,742,253 A | 4/1998 | Conroy et al. | |
| 5,805,983 A | 9/1998 | Naidu et al. | |
| 5,990,721 A | 11/1999 | Mellitz | |
| 6,002,360 A | 12/1999 | Wolcott et al. | |
| 6,075,484 A * | 6/2000 | Daniel et al. | 342/372 |
| 6,199,032 B1 | 3/2001 | Anderson | |
| 6,275,091 B1* | 8/2001 | Saeki | 327/396 |
| 6,377,119 B1* | 4/2002 | Hays | 330/149 |
| 6,434,435 B1 | 8/2002 | Tubel et al. | |
| 6,480,153 B1 | 11/2002 | Jung et al. | |
| 6,563,358 B1 | 5/2003 | Goulette | |
| 6,597,730 B1 | 7/2003 | Bader | |
| 6,611,537 B1* | 8/2003 | Edens et al. | 370/503 |
| 6,647,506 B1 | 11/2003 | Yang et al. | |
| 6,806,837 B1 | 10/2004 | Saucier et al. | |
| 6,816,822 B1 | 11/2004 | Hess et al. | |
| 6,826,521 B1 | 11/2004 | Hess et al. | |
| 6,834,180 B1 | 12/2004 | Marshall | |
| 6,861,975 B1 | 3/2005 | Coleman, Jr. et al. | |
| 6,862,514 B2 | 3/2005 | Ehara | |
| 6,897,807 B2 | 5/2005 | Kishigami et al. | |
| 6,975,268 B2* | 12/2005 | Coleman et al. | 342/375 |
| 7,057,555 B2 | 6/2006 | Lewis | |
| 7,230,970 B1* | 6/2007 | Bryant | 375/130 |
| 7,366,248 B2 | 4/2008 | Wang et al. | |
| 7,460,067 B2 | 12/2008 | Allen et al. | |
| 7,570,686 B2* | 8/2009 | Krinsky et al. | 375/222 |
| 7,663,542 B1 | 2/2010 | Goodzeit et al. | |
| 7,705,779 B2 | 4/2010 | Goldberg et al. | |
| 7,742,904 B2 | 6/2010 | Healy et al. | |
| 7,773,666 B2* | 8/2010 | Belge et al. | 375/222 |
| 7,852,910 B2* | 12/2010 | Belge | 375/222 |
| 7,969,358 B2 | 6/2011 | Martin et al. | |
| 2002/0123045 A1 | 9/2002 | Martinell et al. | |
| 2002/0196186 A1 | 12/2002 | Holt | |
| 2003/0236081 A1 | 12/2003 | Braun | |
| 2004/0169602 A1 | 9/2004 | Hamada et al. | |
| 2006/0109927 A1 | 5/2006 | Magee et al. | |
| 2007/0078530 A1 | 4/2007 | Blevins et al. | |
| 2007/0165691 A1* | 7/2007 | Taverner et al. | 374/120 |
| 2007/0168057 A1 | 7/2007 | Blevins et al. | |
| 2008/0129613 A1 | 6/2008 | Ermutlu et al. | |
| 2009/0048748 A1 | 2/2009 | Zhao et al. | |
| 2009/0167607 A1 | 7/2009 | Holder | |
| 2009/0315565 A1* | 12/2009 | Wyar et al. | 324/533 |
| 2010/0123618 A1* | 5/2010 | Martin et al. | 342/174 |
| 2010/0123624 A1 | 5/2010 | Minear et al. | |
| 2010/0124263 A1 | 5/2010 | Martin et al. | |
| 2010/0124625 A1 | 5/2010 | Blair | |
| 2010/0124895 A1 | 5/2010 | Martin et al. | |
| 2010/0125347 A1 | 5/2010 | Martin et al. | |
| 2011/0022375 A1 | 1/2011 | Odille et al. | |

FOREIGN PATENT DOCUMENTS

| | | |
|---|---|---|
| EP | 1271802 A1 | 1/2003 |
| JP | 2004 147130 | 5/2004 |
| WO | WO-01 65637 A2 | 9/2001 |
| WO | WO-2007001252 A1 | 1/2007 |
| WO | WO-2008074925 A1 | 6/2008 |

OTHER PUBLICATIONS

Haynes, T., White Paper, "A Primer on Digital Beamforming", Spectrum Signal Processing, Mar. 26, 1998.

Krim, H., et al. "Two Decades of Array Signal Processing Research", IEEE Signal Processing Magazine, pp. 67-94; Jul. 1996.

Swarup, G., et al., "Phase Adjustment of Large Antennas" IRE Transactions on Antennas and Propagation, IEEE, USA, vol. 10, No. 1., Jan. 1, 1961, pp. 75-81.

Hills, et al., "The Atacama Large Millimeter/submillimeter Array", Proc. of SPIE vol. 7012, 70120N (2008) SPIE, PO Box 10 Bellingham WA 98227-0010 USA, Jul. 10, 2008, XP040439602, abstract.

Steinberg, Bernard D., "Phase Synchronizing a Nonrigid, Distributed, Transmit-Receive Radar Antenna Array", IEEE Transactions on Aerospace and Electronic Systems, IEEE Service Center, Piscataway, NJ, US, vol. AES-10, No. 5, Sep. 1, 1982, pp. 609-620, XP011166973, ISSN: 0018:9251.

Bourgeois, et al., "Computer antenna pointing for orbital debris radao", Antennas and Propagation Society International Symposium, 1993, vol. 2, pp. 758-176.

Written Opinion of the International Preliminary Examining Authority, mailed Dec. 1, 2010, issued in application serial No. PCT/US2009/064973 in the name of Harris Corporation.

International Search Report and Written Opinion mailed Feb. 9, 2010, in connection with application serial No. PCT/US2009/065092, in the name of Harris Corporation.

International Search Report and Written Opinion mailed Feb. 9, 2010, in connection with application serial No. PCT/US2009/064973, in the name of Harris Corporation.

International Search Report mailed May 20, 2010; International Application Serial No. PCT/US2009/064942, in the name of Harris Corporation.

International Search Report mailed May 20, 2010; International Application Serial No. PCT/US2009/065029, in the name of Harris Corporation.

International Search Report mailed May 20, 2010; International Application Serial No. PCT/US2009/065039, in the name of Harris Corporation.

International Search Report mailed Mar. 4, 2010; International Application Serial PCT/US2009/065066, in the name of Harris Corporation.

Li, Y., et al., "Adaptive Blind Source Separation and Equalization for Multiple-Input/Multiple-Output Systems" IEEE Transactions on Information Theory, vol. 44, No. 7, Nov. 2, 1998, pp. 2864-2876, XP002576178.

Qin, J. S et al: "A survey of industrial model predictive control technology" Control Engineering Practice, Pergamon Press, Oxford, GB, vol. 11, Jan. 1, 2003,pp. 733-764, XP002435295 ISSN: 0967-0661.

Gawronski, W.: "Control and Pointing Challenges of Large Antennas and Telescopes" IEEE Transactions on Control Systems Technology, IEEE Service Center, New York, NY, US, vol. 15, No. 2, Mar. 1, 2007, pp. 276-289, XP011168299 ISSN: 1063-6536.

Maneri E et al: "LQG controller design using GUI: Application to antennas and radio-telescopes" ISA Transactions, Instrument Society of America. Pittsburgh, US, vol. 39, No. 2, Apr. 1, 2000,pp. 243-264, XP004313422.

* cited by examiner

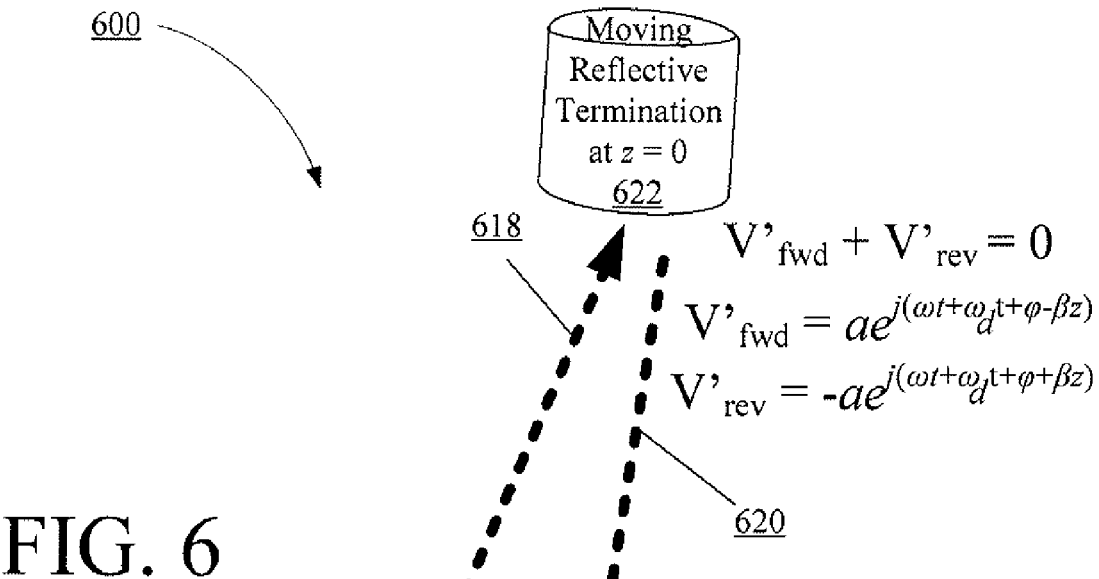
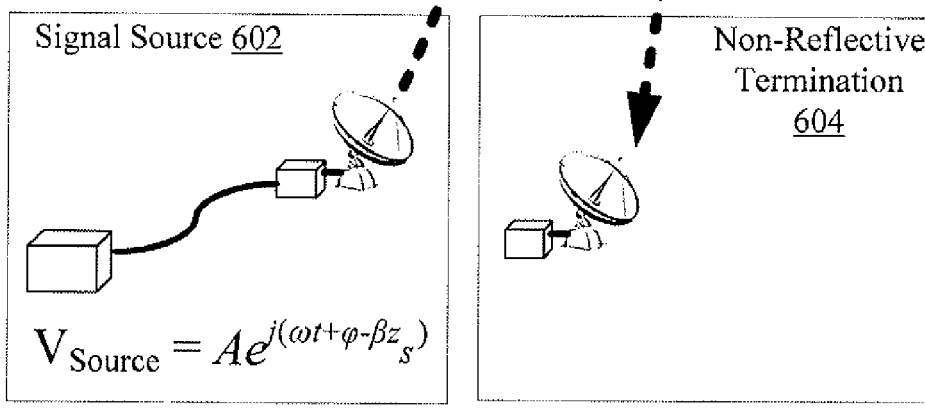
FIG. 6

METHODS FOR DETERMINING A
REFERENCE SIGNAL AT ANY LOCATION
ALONG A TRANSMISSION MEDIA

BACKGROUND OF THE INVENTION

1. Statement of the Technical Field

The invention concerns systems implementing methods for determining a reference signal at any location along a transmission media.

2. Description of the Related Art

There are many systems and applications known to those having ordinary skill in the art that can benefit from an ability to determine a reference signal at any location along a transmission media. Such systems include, but are not limited to, radar systems and communication systems. For example, a conventional wireless communication system typically includes a system controller, a plurality of antenna controllers, and a plurality of antenna elements (e.g., a plurality of dish antennas). Each of the antenna elements is communicatively coupled to the system controller and a respective one of the antenna controllers via a cable assembly. During transmission and reception, each antenna element converts electrical signals into electromagnetic waves, and vice versa. The phases of the signals to be transmitted from and received by the antenna elements can be shifted as a result of environmental effects on hardware components of the system controller, hardware components of the antenna controllers, and the cable assemblies connecting the antenna elements to the controllers. These phase shifts typically result in the steering of the radiated main beam in the wrong direction. In order to overcome the various limitations of the communication system, it needs to implement a beamforming solution that counter acts the phase shifts resulting from environmental effects on the hardware components and cables thereof.

SUMMARY OF THE INVENTION

Embodiments of the present invention concern methods for determining at least one reference signal. The method embodiments involve sensing at a first location along the transmission media a first signal propagated over the transmission media in a forward direction and a second signal propagated over the transmission media in a reverse direction opposed from the forward direction. The transmission media can include, but is not limited to, free space, waveguides, coaxial transmission lines, optical fibers, and acoustic media. The second signal is a reflected version of the first signal. Thereafter, a first sum signal is determined by adding the first and second signals together. Similarly, a first difference signal is determined by subtracting the second signal from the first signal. A first exponentiation signal is then determined using the first sum signal. Likewise, a second exponentiation signal is determined using the first difference signal. The first exponentiation signal is subtracted from the second exponentiation signal to obtain a first reference signal. Notably, the first reference signal can be subsequently utilized by a communication system to control the phase of a communication signal.

According to an aspect of the present invention, the first reference signal can have a first frequency equal to a second frequency of the first signal. Alternatively, the first reference signal can have a first frequency different than a second frequency of the first signal. In such a scenario, the first reference signal can be processed to obtain an adjusted reference signal with a third frequency equal to the second frequency of the first signal.

According to another aspect of the present invention, the method embodiments can further involve sensing at a second location different from the first location along the transmission media the first and second signal. Thereafter, a second reference signal is determined using the first and second signal sensed at the second location. The second reference signal has the same phase as the first reference signal.

The second reference signal is determined by determining a second sum signal by adding the first and second signals sensed at the second location together and a second difference signal by subtracting the second signal sensed at the second location from the first signal sensed at the second location. The second reference signal is also determined by determining a third exponentiation signal using the second sum signal and a fourth exponentiation signal using the second difference signal. The third exponentiation signal is subtracted from the fourth exponentiation signal to obtain the second reference signal.

BRIEF DESCRIPTION OF THE DRAWINGS

Embodiments will be described with reference to the following drawing figures, in which like numerals represent like items throughout the figures, and in which:

FIG. 6 is a block diagram of an exemplary system including a moving reflective termination that is configured for determining a reference signal.

DETAILED DESCRIPTION

Figure 1:
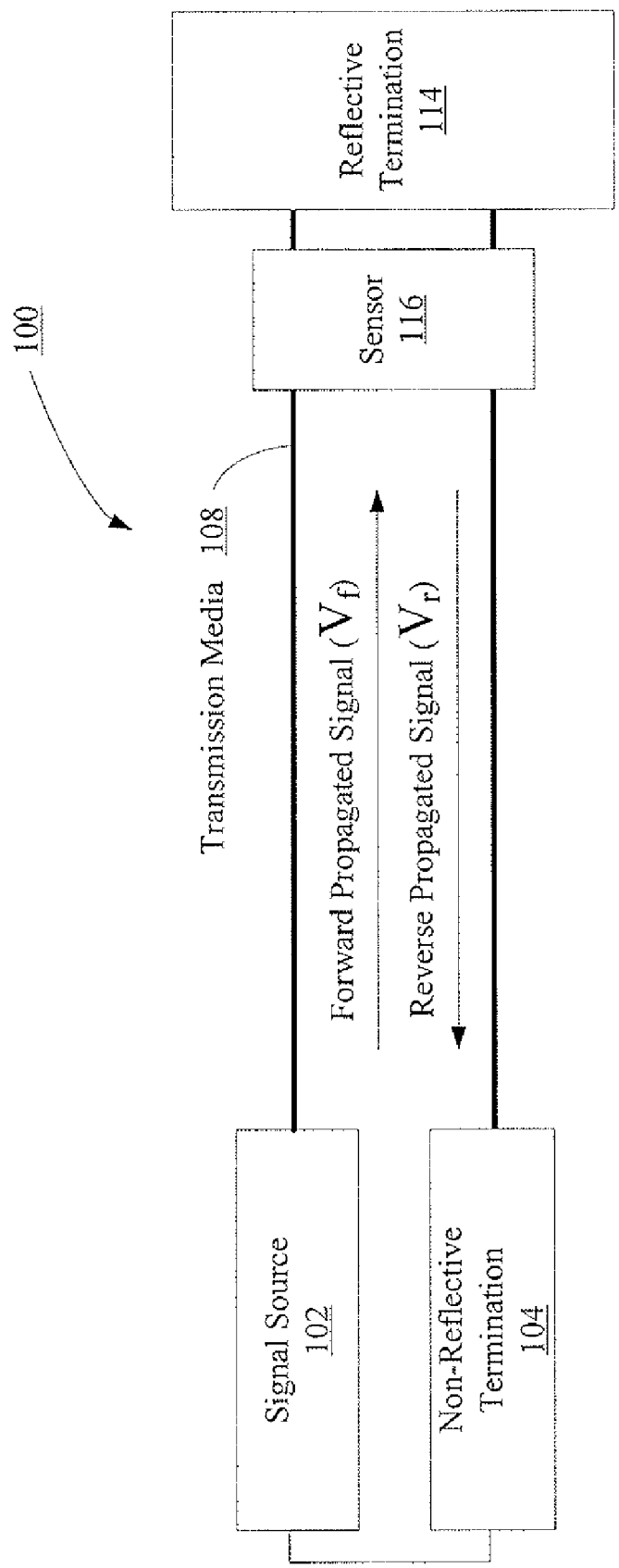
FIG. 1 is a block diagram of an exemplary system including a stationary reflective termination that is useful for understanding the present invention.

The present invention is described with reference to the attached figures, wherein like reference numbers are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention provide methods for determining a reference signal at any location along a transmission media. The methods generally involve sensing at a first location along the transmission media a first signal propagated over the transmission media in a forward direction and a second signal propagated over the transmission media in a reverse direction opposed from the forward direction. The second signal is a reflected version of the first signal. The methods also involve determining a sum signal by adding the first and second signals together and a difference signal by subtracting the second signal from the first signal. A first exponentiation signal is computed using the sum signal. Similarly, a second exponentiation signal is determined using the difference signal. The first exponentiation signal is subtracted from the second exponentiation signal to obtain a reference signal. Notably, the reference signal is defined by a mathematical equation that is not dependant on "z", the location along the transmission media. As such, the reference signal can be determined at any location along the transmission media and/or at multiple different locations along the transmission media. The reference signal will exhibit the same phase at all locations. Notably, the reference signal(s) can be used in a variety of applications. For example, the reference signal(s) can be used to adjust a phase of transmit and/or receive signals so as to counteract the environmental effects on hardware components of a communication system.

Before describing the systems and methods of the present invention, it will be helpful in understanding exemplary environments in which the invention can be utilized. In this regard, it should be understood that the methods of the present invention can be utilized in a variety of different applications where a reference signal needs to be determined at any location along a transmission media. Such applications include, but are not limited to, mobile/cellular telephone applications, military communication applications, space communication applications, phased array calibration and timing applications, radar signal distribution applications, radar calibration applications for large radar arrays, radar calibration applications for cooperative radar installations, time synchronization applications for sensors, time synchronization applications for digital systems, time synchronization applications for clocks, time synchronization applications for events, and large area (e.g., from several meters to interplanetary) metrology applications.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Systems and Methods for Determining One or More Reference Signals

Referring now to FIG. 1, there is provided a block diagram of a system 100 that is useful for understanding the present invention. As shown in FIG. 1, the system 100 can comprise a signal source 102, a sensor 116, a reflective termination 114, and a non-reflective termination 104. Each of these components 102, 104, 114, 116 is well known to those having ordinary skill in the art, and therefore will not be described in detail herein. However it should be understood that in order to determine a reference signal $V_{ref}$, a forward propagated signal $V_f$ and a reverse propagated signal $V_r$ need to be sensed at a location "z" along the transmission media 108. Although, the transmission media 108 is shown in FIG. 1 to include a coaxial transmission line, embodiments of the present invention are not limited in this regard. For example, the transmission media 108 can also include free space, a waveguide, an optical fiber, and an acoustic media.

In operation, the signal source 102 generally communicates a signal $V_f$ to the reflective termination 114. A reflected version of the transmitted signal $V_r$ is communicated from the reflective termination 114 to the non-reflective termination 104. The sensor 116 senses the presence of the forward propagated signal $V_f$ and the reverse propagated signal $V_r$ on the transmission media 108. The sensor 116 may also adjust the gain of the signals $V_f$, $V_r$ so that they have equal arbitrarily defined amplitudes "a". This gain adjustment can involve performing Automatic Gain Control (AGC) operations which are well known to those having ordinary skill in the art. Thereafter, the sensor 116 outputs signals representing the forward propagated signal $V_f$ and the reverse propagated signal $V_r$. These output signals can subsequently be used to determine the reference signal $V_{ref}$.

Figure 2:
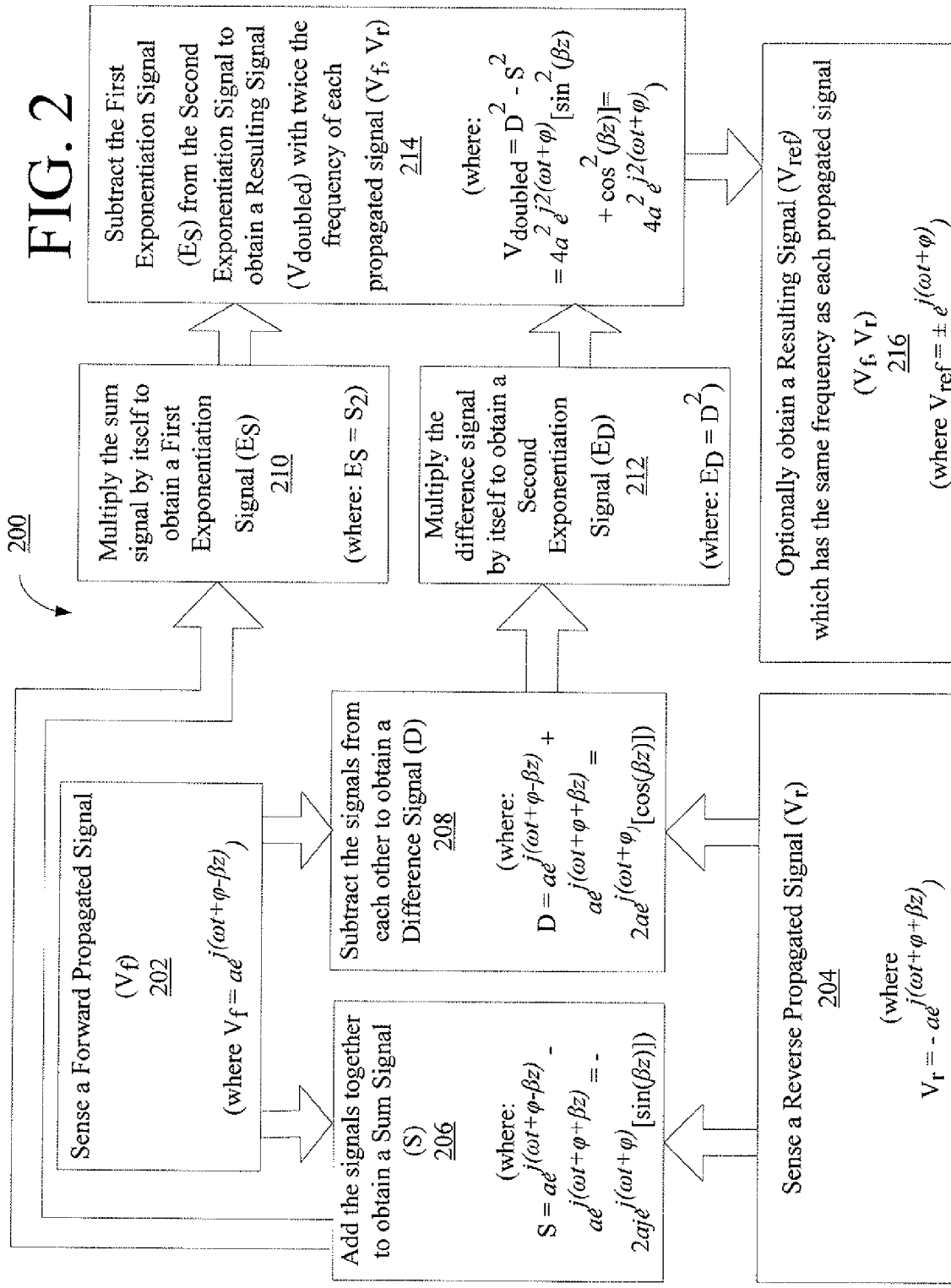
FIG. 2 is a conceptual diagram of a first exemplary method (or process) for determining a reference signal at any location along a transmission media.

A conceptual diagram of a first exemplary process 200 for determining the reference signal $V_{ref}$ is provided in FIG. 2. As shown in FIG. 2, the process 200 begins by (202, 204) sensing a forward propagated signal $V_f$ and a reverse propagated signal $V_r$. It should be appreciated that the sensing processes (202, 204) can involve gain adjustments as necessary so that the resulting signals have an arbitrarily defined amplitude a. The gain adjustments can include AGC operations. The forward propagated signal $V_f$ can be defined by the following mathematical equation (1). Similarly, the reverse propagated signal $V_r$, for the exemplary case of a short circuit reflection, can be defined by the following mathematical equation (2).

$$V_f = ae^{j(\omega t + \phi - \beta z)} \tag{1}$$

$$V_r = -ae^{j(\omega t + \phi + \beta z)} \tag{2}$$

where a is a signal amplitude. j is the square root of minus one $(j=(-1)^{1/2})$. ω is a radian frequency. φ is a phase angle. β is a wave number that is equal to 2π/λ, where λ is a wavelength. z is a location along a transmission media measured from the reflective end of the transmission media.

Thereafter, a signal combination operation 206 is performed where the signals $V_f$, $V_r$ are combined to obtain a Sum signal (S). This signal combination operation 206 generally involves adding the signals $V_f$, $V_r$ together. The signal combination operation 206 can be defined by the following mathematical equation (3).

$$S = ae^{j(\omega t + \phi - \beta z)} - ae^{j(\omega t + \phi + \beta z)} = 2aje^{j(\omega t + \phi)}[\sin(\beta z)] \tag{3}$$

As evident from mathematical equation (3), the Sum signal S is a signal that depends on the location "z" at which the sensor 116 is placed along the transmission media 108.

The process 200 also involves performing a subtraction operation 208. The subtraction operation 208 generally involves subtracting the reverse propagated signal $V_r$ from the forward propagated signal $V_f$ to obtain a Difference signal (D). The subtraction operation 208 can be defined by the following mathematical equation (4).

$$D = ae^{j(\omega t + \phi - z)} + ae^{j(\omega t + \phi + \beta z)} = 2ae^{j(\omega t + \phi)}[\cos(\beta z)] \quad (4)$$

As evident from mathematical equation (4), the Difference signal D is a signal that depends on the location "z" at which the sensor 116 is placed along the transmission media 108.

After determining the Sum signal S and the Difference signal D, the process 200 continues with a plurality of multiplication operations 210, 212. A first one of the multiplication operations 210 generally involves multiplying the Sum signal S by itself to obtain a first Exponentiation signal $E_S$. The first multiplication operation 210 can generally be defined by the following mathematical equation (5).

$$E_S = S \cdot S = S^2 \quad (5)$$

where $E_S$ is the first Exponentiation signal. S is the Sum signal. $S^2$ is the Sum signal S raised to the second power.

A second one of the multiplication operations 212 generally involves multiplying the Difference signal D by itself to obtain a second Exponentiation signal $E_D$. The second multiplication operation 212 can generally be defined by the following mathematical equation (6).

$$E_D = D \cdot D = D^2 \quad (6)$$

where $E_D$ is the second Exponentiation signal. D is the Difference signal. $D^2$ is the Difference signal D raised to the second power.

Subsequent to determining the first and second Exponentiation signals, the process continues with a subtraction operation 214. The subtraction operation 214 generally involves subtracting the first Exponentiation signal $E_S$ from the second Exponentiation signal $E_D$. The subtraction operation 214 can be defined by the following mathematical equation (7).

$$V_{doubled} = D^2 - S^2 = 4a^2 e^{j2(\omega t + \phi)}[\sin^2(\beta z) + \cos^2(\beta z)] = 4a^2 e^{j2(\omega t + \phi)} \quad (7)$$

where $V_{doubled}$ represents a signal obtained as a result of performing the subtraction operation 214. As evident from mathematical equation (7), the resulting signal $V_{doubled}$ does not depend on the location "z" at which the sensor 116 is placed along the transmission media 108. As such, the signal $V_{doubled}$ can be determined at one or more locations along a transmission media. This location "z" independence is a significant and highly desirable result.

The resulting signal $V_{doubled}$ has twice the frequency relative to that of each propagated signal $V_f$, $V_r$. As such, the resulting signal $V_{doubled}$ can be further processed to increase its frequency to a desired value or to reduce its frequency to a desired value (e.g., the value of the frequency of a propagated signal $V_f$, $V_r$). If the resulting signal $V_{doubled}$ is further processed to increase its frequency, then the process 200 can include a multiplication operation (not shown). If the resulting signal $V_{doubled}$ is further processed to reduce its frequency, then the process 200 can include a frequency reduction operation 216.

The optional frequency reduction operation 216 can generally involve performing a phase locked loop operation and a frequency division operation. Phase locked loop operations are well known to those having ordinary skill in the art, and therefore will not be described herein. The frequency division operation can involve dividing the frequency of the resulting signal $V_{doubled}$ by two (2). The output signal from the frequency reduction operation is the reference signal $V_{ref}$. The reference signal $V_{ref}$ can be defined by the following mathematical equation (8):

$$V_{ref} = \pm e^{j(\omega t + \phi)} \quad (8)$$

for any line position "z". As evident from mathematical equation (8), the reference signal $V_{ref}$ is a signal that does not depend on the location "z" at which the sensor 116 is placed along the transmission media 108. As such, the reference signal $V_{ref}$ can be determined at one or more locations along a transmission media. This location "z" independence is a significant and highly desirable result.

Figure 3:
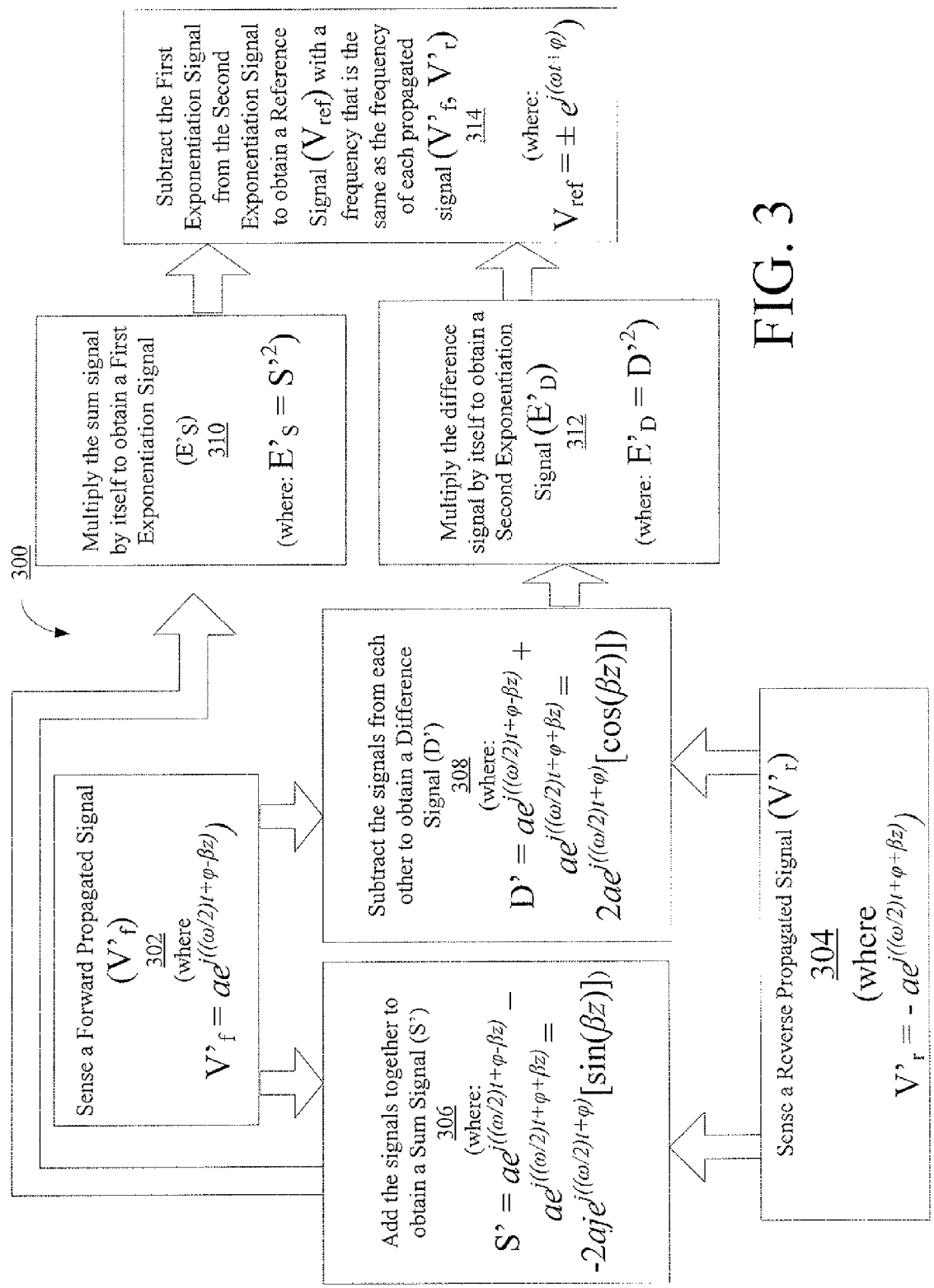
FIG. 3 is a conceptual diagram of a second exemplary method (or process) for determining a reference signal at any location along a transmission media.

Embodiments of the present invention are not limited to the process 200 described above in relation to FIG. 2. For example, if the frequency of each propagated signal $V_f$, $V_r$ is reduced by exactly half, then the optional frequency reduction operation 216 need not be performed. A conceptual diagram of a process 300 for determining the reference signal $V_{ref}$ absent of the frequency reduction operation 216 is provided in FIG. 3. As shown in FIG. 3, the propagated signals with half the frequency of the signals $V_f$, $V_r$ have the following designations $V'_f$, $V'_r$, respectively.

As shown in FIG. 3, the process 300 generally involves performing sensing operations 302, 304 to sense propagated signals $V'_f$, $V'_r$, a signal combination operation 306, subtraction operations 308, 314, and multiplication operations 310, 312. These listed operations 302, 304, ..., 314 are the same as or substantially similar to the operations 202, 204, ..., 214 of FIG. 2, respectively. As such, the operations 302, 304, ..., 314 of process 300 will not be described herein.

Figure 4:
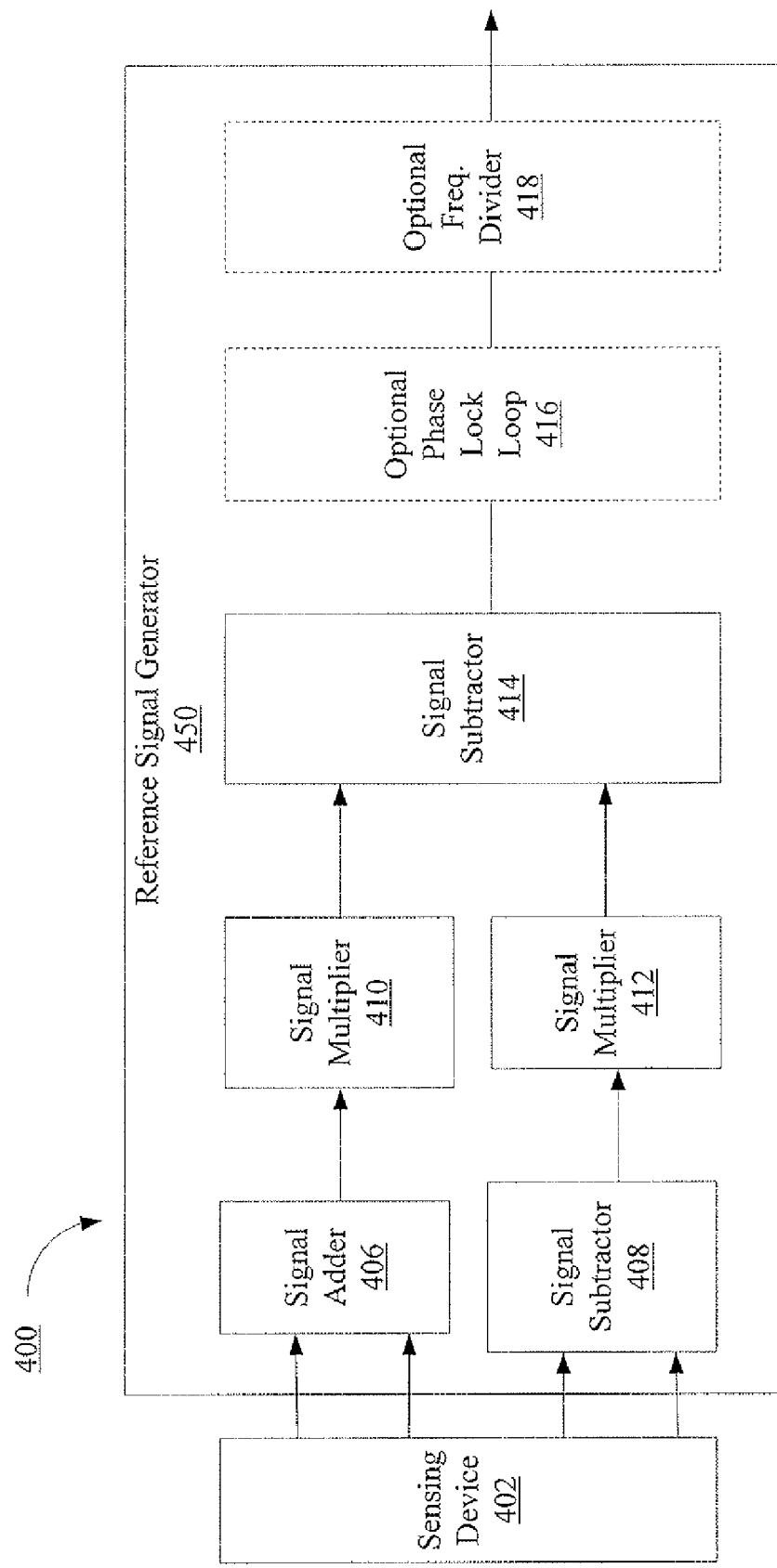
FIG. 4 is a block diagram of a first exemplary embodiment of a system configured to generate a reference signal in accordance with the methods of FIGS. 2 and 3.

Referring now to FIG. 4, there is provided a block diagram of an exemplary system 400 implementing a method for determining a signal $V_{doubled}$ and/or a reference signal $V_{ref}$. As shown in FIG. 4, the system 400 comprises a sensing device 402 and a reference signal generator 450. The reference signal generator 450 includes a signal adder 406, signal subtractors 408, 414, and signal multipliers 410, 412. The reference signal generator 450 can also comprise an optional phase lock loop 416 and an optional frequency divider 418.

The sensing device 402 is generally configured for sensing the presence of a forward propagated signal $V_f$ or $V'_f$ and a reverse propagated signal $V_r$ or $V'_r$ on the transmission media 108. The sensing device 402 may also adjust the gain of the signals $V_f$ or $V'_f$, $V_r$ or $V'_r$ so that they have equal arbitrarily defined amplitudes "a". This gain adjustment can involve performing AGC operations. The sensing device 402 can also generate output signals representing the forward propagated signal $V_f$ or $V'_f$ and the reverse propagated signal $V_r$ or $V'_r$. These output signals can subsequently be used to determine the signal $V_{doubled}$ or the reference signal $V_{ref}$. As such, the sensing device 402 can further communicate the signals representing the forward propagated signal $V_f$ or $V'_f$ and the reverse propagated signal $V_r$ or $V'_r$ to the following components 406, 408.

The signal adder 406 is generally configured for performing a signal combination operation 206, 306 (described above in relation to FIGS. 2 and 3) to obtain a Sum signal S or S'. The signal subtractor 408 is generally configured for performing a subtraction operation 208, 308 (described above in relation to FIGS. 2 and 3) to obtain a Difference signal D or D'. The output signals of the components 406, 408 are forwarded to the signal multipliers 410, 412. Each of the multipliers 410, 412 is configured to perform a multiplication operation 210, 212, 310, 312 (described above in relation to FIGS. 2 and 3) to obtain a respective Exponentiation signal $E_S$, $E'_S$, $E_D$, or $E'_D$. The Exponentiation signals $E_S$ and $E_D$ or $E'_S$ and $E'_D$ are then communicated from the signal multipliers 410, 412 to the signal subtractor 414. At the signal subtractor 414, a subtraction operation 214, 314 (described above in relation to FIGS. 2 and 3) is performed to obtain a signal $V_{doubled}$ or a reference signal $V_{ref}$.

If the result of the subtraction operation is the signal $V_{doubled}$, then the signal $V_{doubled}$ can be further processed to increase or reduce the value of its frequency. If the frequency of the signal $V_{doubled}$ is to be increased, then the signal $V_{doubled}$ can be forwarded to a multiplier (not shown). If the frequency of the signal $V_{doubled}$ is to be reduced, then the signal $V_{doubled}$ can be forwarded to an optional phase lock loop 416 and an optional frequency divider 418. The components 416, 418 collectively act to reduce the frequency of the signal $V_{doubled}$ to a desired value (i.e., the value of the frequency of a propagated signal $V_f$, $V_r$). The output of the frequency divider 418 is the reference signal $V_{ref}$.

Figure 5:
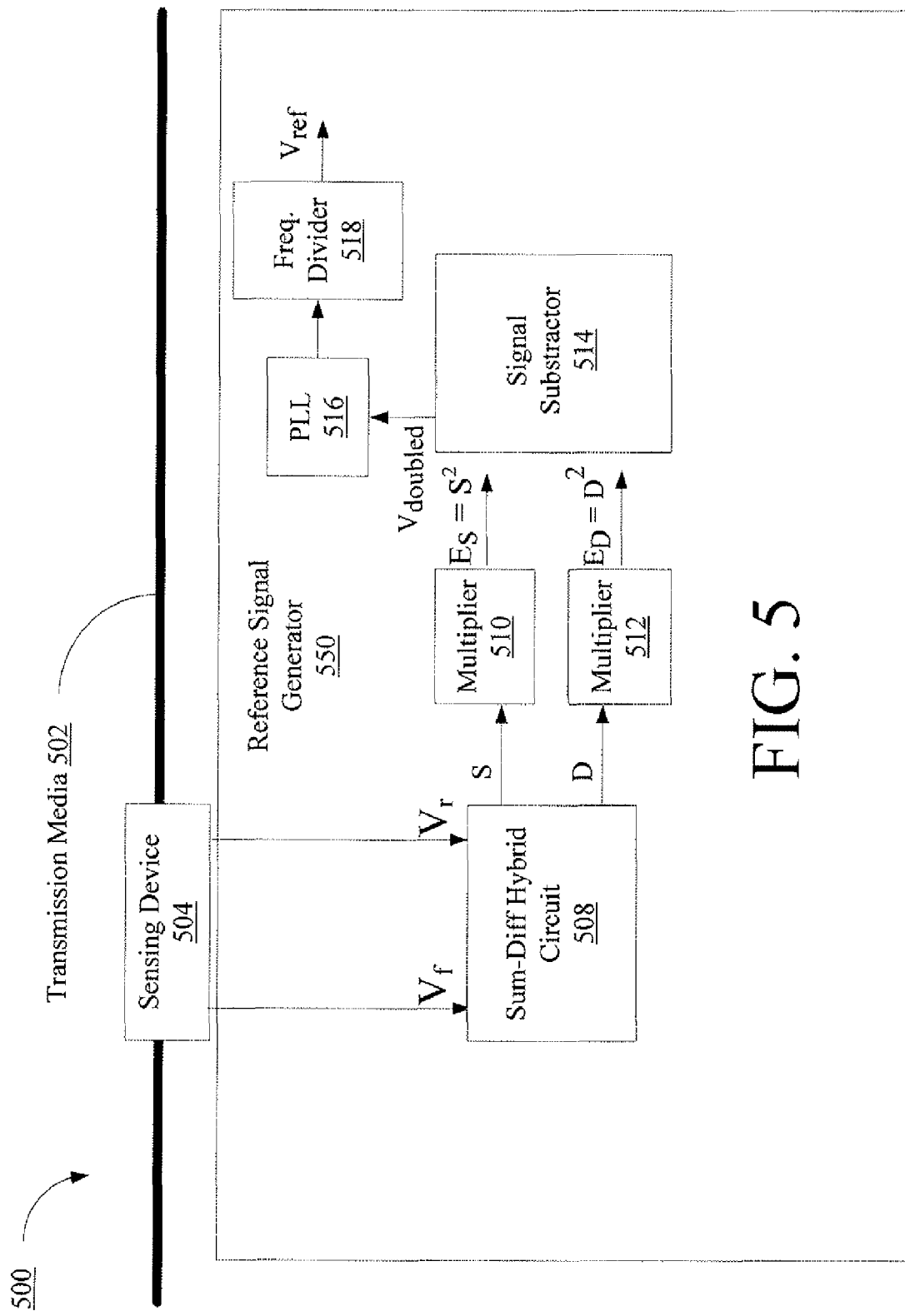
FIG. 5 is a block diagram of a second exemplary embodiment of a system configured to generate a reference signal in accordance with the method of FIG. 2.

Referring now to FIG. 5, there is provided a block diagram of another exemplary embodiment of a system 500 implementing a method for determining a reference signal $V_{ref}$. As shown in FIG. 5, the system 500 comprises a sensing device 504 disposed along a transmission media 502. Although, the transmission media 502 is shown in FIG. 5 to include a coaxial transmission line, embodiments of the present invention are not limited in this regard. For example, the transmission media 502 can also include free space, a waveguide, and an acoustic media. The system 500 also comprises a reference signal generator 550 for generating a reference signal. Accordingly, the reference signal generator 550 includes a sum-diff hybrid circuit 508, multipliers 510, 512, a signal subtractor 514, a phase lock loop (PLL) 516, and a frequency divider 518. Embodiments of the present invention are not limited to the configuration shown in FIG. 5. For example, the reference signal generator 550 can be absent of the PLL 516 and the frequency divider 518. The reference signal generator 550 can also include a phase locked oscillator (not shown) instead of the PLL 516 and the frequency divider 518.

The sensing device 504 is generally configured for sensing the presence of a forward propagated signal $V_f$ and a reverse propagated signal $V_r$ on the transmission media 502. The sensing device 504 may also adjust the gain of the signals $V_f$, $V_r$ so that they have equal arbitrarily defined amplitudes "a". This gain adjustment can involve performing AGC operations. The sensing device 504 can also generate output signals representing the forward propagated signal $V_f$ and the reverse propagated signal $V_r$. These output signals can subsequently be used to determine the reference signal $V_{ref}$. As such, the sensing device 504 can further communicate the signals representing the forward propagated signal $V_f$ and the reverse propagated signal $V_r$ to the sum-diff hybrid circuit 508.

The sum-diff hybrid circuit 508 is generally configured for performing a signal combination operation 206 (described above in relation to FIG. 2) to obtain a Sum signal S and a subtraction operation 208 (described above in relation to FIG. 2) to obtain a Difference signal D. Subsequent to completing the signal combination operation 206 and the subtraction operation 208, the sum-diff hybrid circuit 508 communicates the signals S, D to the multipliers 510, 512, respectively. Each of the multipliers 510, 512 is configured to perform a multiplication operation 210, 212 (described above in relation to FIG. 2) to obtain a respective Exponentiation signal $E_S$, $E_D$. The Exponentiation signals $E_S$, $E_D$ are then communicated from the multipliers 510, 512 to the signal subtractor 514. At the signal subtractor 514, a subtraction operation 214 (described above in relation to FIG. 2) is performed to obtain a signal $V_{doubled}$. The signal $V_{doubled}$ is then processed by the PLL 516 and frequency divider 518 to reduce the frequency of the signal $V_{doubled}$ to a desired value (i.e., the value of the frequency of a propagated signal $V_f$, $V_r$). The output of the frequency divider 518 is the reference signal $V_{ref}$. It should be noted that the functions of the PLL 516 and the frequency divider 518 can alternatively be performed by a phase locked oscillator (not shown).

Referring now to FIG. 6, there is provided a block diagram of an exemplary system 600 configured for determining a reference signal $V_{REF}$ when a termination is moving. In order to determine a reference signal $V_{REF}$, a transmit signal and a reflected signal need to be sensed at a location "z" along the transmission media. Although the transmission media is shown in FIG. 6 to include free space, embodiments of the present invention are not limited in this regard.

As shown in FIG. 6, the system 600 comprises a signal source 602, a moving reflective termination 622, and a non-reflective termination 604. Each of these components 602, 622, 604 is well known to those having ordinary skill in the art, and therefore will not be described in detail herein. However, it should be appreciated that the signal source 602 can include, but is not limited to, an element control system, Radio Frequency (RF) equipment, and an antenna element. Similarly, the non-reflective termination 604 can include, but is not limited to, an element control system, Radio Frequency (RF) equipment, and an antenna element. The moving reflective termination 622 can be, but is not limited to, an aircraft, a spacecraft, a natural or artificial satellite, or a celestial object (e.g., a planet, a moon, an asteroid, a comet, etc . . . ).

In operation, the signal source 602 generally transmits a signal $V_{fwd}$ in the direction 618 of the moving reflective termination 622. The transmit signal $V_{fwd}$ is the same as the forward propagated signal $V_f$. As such, the transmit signal $V_{fwd}$ can generally be defined by mathematical equation (1). A reflected version of the transmitted signal $V_{rev}$ is communicated from the moving reflective termination 622 in the direction 620 of the non-reflective termination 604. The reflected signal $V_{rev}$ can generally be defined by the following mathematical equation (9).

$$V_{rev} = -ae^{j(\omega t + 2\omega_d t \phi + \beta z)} \quad (9)$$

where $\phi_d$ is a Doppler frequency shift. The signals $V_{fwd}$, $V_{rev}$ can be sensed at a location "z" along the transmission media and subsequently used in a source reference frame (SRF) based process to a determine the reference signal $V_{REF}$.

The SRF based process is substantially similar to the process described above in relation to FIG. 2. Accordingly, the SRF based process generally involves performing an addition operation, subtraction operations, and multiplication operations. The addition operation of the SRF based process can generally be defined by the following mathematical equation (10).

$$\text{Sum} = ae^{j(\omega t + \phi - \beta z)} - ae^{j(\omega t + 2\omega_d t + \phi + \beta z)} = 2aje^{j(\omega t + \omega_d t + \phi)}[\sin(\omega_d t + \beta z)] \quad (10)$$

where Sum is a resulting signal of the addition operation of the SRF based process A first subtraction operation of the SRF based process can generally be defined by the following mathematical equation (11).

$$\text{Diff} = ae^{j(\omega t + \phi - \beta z)} + ae^{j(\omega t + 2\omega_d t + \phi + \beta z)} = 2ae^{j(\omega t + \omega_d t + \phi)}[\cos(\omega_d t + \beta z)] \quad (11)$$

where Diff is a resulting signal of the subtraction operation of the SRF based process.

The multiplication operations of the SRF based process can generally be defined by the following mathematical equations (12) and (13).

$$EX_S = Sum^2 \quad (12)$$

$$EX_D = Diff^2 \quad (13)$$

where $EX_S$ and $EX_D$ are the resulting signals of the multiplication operations of the of the SRF based process.

A second subtraction operation of the SRF based signal sampling process can generally be defined by the following mathematical equation (14).

$$V_{DBL} = Diff^2 - Sum^2 = 4a^2 e^{j2(\omega t + \omega_d t + \phi)}[\cos^2(\omega_d t + \beta z) + \sin^2(\omega_d t + \beta z)] = 4a^2 e^{j2(\omega t + \omega_d t + \phi)} \quad (14)$$

where $V_{DBL}$ is a resulting signal of the second subtraction operation of the SRF based process.

Subsequent to determining the signal $V_{DBL}$, further processing can be performed for increasing or decreasing the signals $V_{DBL}$ frequency. If the frequency of the signal $V_{DBL}$ is reduced by half, then the resulting reference signal $V_{REF}$ can generally be defined by the following mathematical equation (15).

$$V_{REF} = \pm e^{j(\omega t + \omega_d t + \phi)} \quad (15)$$

where $V_{REF}$ is the signal resulting from an optional frequency decrease process of the SRF based process. The optional frequency decrease process can involve performing a phase locked loop operation and a frequency division operation.

Notably, the reference signal $V_{REF}$ can also be determined by performing a moving reference frame (MRF) based process. The MRF based process is substantially similar to the process described above in relation to the SRF based process. Accordingly, the MRF based process generally involves performing an addition operation, subtraction operations, and multiplication operations. However, the transmit signal utilized in the MRF based process is defined by the following mathematical equation (16).

$$V'_{fwd} = ae^{j(\omega t + \omega_d t + \phi - \beta z)} \quad (16)$$

The reverse signal utilized in the MRF signal sampling process is defined by the following mathematical equation (17).

$$V'_{rev} = -ae^{j(\omega t + \omega_d t + \phi + \beta z)} \quad (17)$$

where $\omega_d$ is a Doppler frequency shift.

The addition operation of the MRF based process can generally be defined by the following mathematical equation (18).

$$Sum' = V'_{fwd} + V'_{rev} = ae^{j(\omega t + \omega_d t + \phi - \beta z)} - ae^{j(\omega t + \omega_d t + \phi + \beta z)} = -2aje^{j(\omega t + \omega_d t + \phi)}[\sin(\beta z)] \quad (18)$$

where Sum' is a resulting signal of the addition operation of the MRF based process.

A first subtraction operation of the MRF based process can generally be defined by the following mathematical equation (19).

$$Diff' = V'_{fwd} - V'_{rev} = ae^{j(\omega t + \omega_d t + \phi - \beta z)} + ae^{j(\omega t + \omega_d t + \phi + \beta z)} = 2ae^{j(\omega t + \omega_d t + \phi)}[\cos(\beta z)] \quad (19)$$

where Diff' is a resulting signal of the subtraction operation of the MRF based process.

The multiplication operations of the MRF based process can generally be defined by the following mathematical equations (20) and (21).

$$EX'_S = Sum'^2 \quad (20)$$

$$EX'_D = Diff'^2 \quad (21)$$

where $EX'_S$ and $EX'_D$ are the resulting signals of the multiplication operations of the MRF based process.

A second subtraction operation of the MRF based process can generally be defined by the following mathematical equation (22).

$$V'_{DBL} = Diff'^2 - Sum'^2 = 4a^2 e^{j2(\omega t + \omega_d t + \phi)}[\cos^2(\beta z) + \sin^2(\beta z)] = 4a^2 e^{j2(\omega t + \omega_d t + \phi)} \quad (22)$$

where $V'_{DBL}$ is a resulting signal of the second subtraction operation of the MRF based process. Subsequent to determining the signal $V'_{DBL}$, further processing can be performed for increasing or decreasing its frequency. If the frequency of the signal is reduced by half, then the resulting signal of the MRF based process is the reference signal $V_{REF}$.

Figure 7:
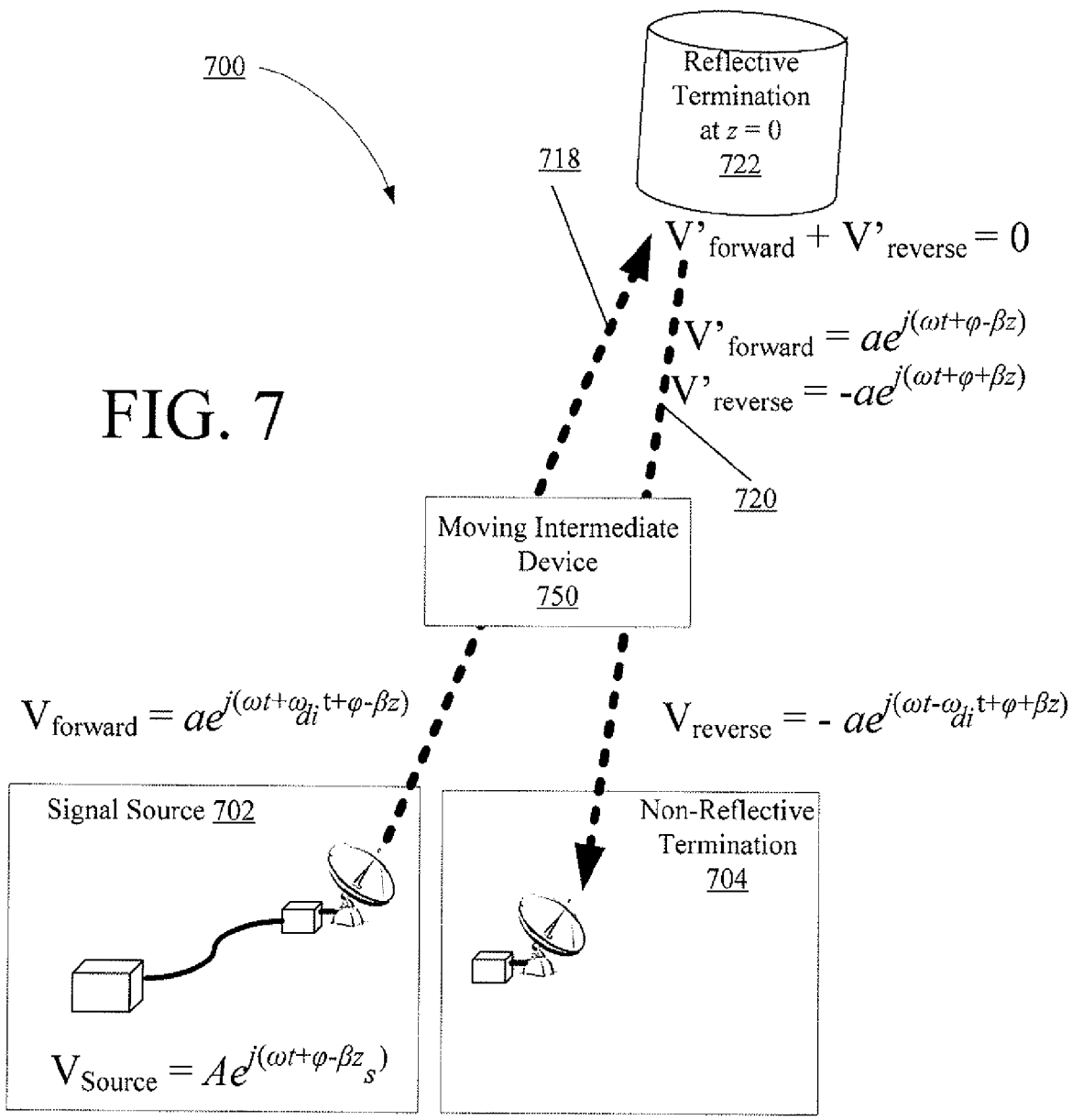
FIG. 7 is a block diagram of an exemplary system including a moving intermediate device that is configured for determining a reference signal.

Referring now to FIG. 7, there is provided a block diagram of an exemplary system 700 that is configured for determining a reference signal when an intermediary device is moving. In order to determine a reference signal $V_{ref}$, a transmit signal and a reflected signal need to be sensed at a location "z" along the transmission media. Although the transmission media is shown in FIG. 7 to include free space, embodiments of the present invention are not limited in this regard.

As shown in FIG. 7, the system 700 comprises a signal source 702, a reflective termination 722, a moving intermediary device 750, and a non-reflective termination 704. Each of these components 702, 704, 722, 750 is well known to those having ordinary skill in the art, and therefore will not be described in detail herein. However, it should be appreciated that the signal source 702 can include, but is not limited to, an element control system, Radio Frequency (RF) equipment, and an antenna element. Similarly, the non-reflective termination 704 can include, but is not limited to, an element control system, Radio Frequency (RF) equipment, and an antenna element. The reflective termination 722 can be, but is not limited to, a natural satellite, an artificial satellite, and a celestial object (e.g., a planet, a moon, an asteroid, a comet, etc . . . ). The moving intermediary device 750 can be, but is not limited to, an aircraft, a space craft, a natural satellite, an artificial satellite, and a celestial object (e.g., a planet, a moon, an asteroid, a comet, etc . . . ).

In operation, the signal source 702 generally transmits a signal $V_{forward}$ in the direction 718 of the reflective termination 722. The transmit signal $V_{forward}$ can generally be defined by the following mathematical equation (23).

$$V_{forward} = ae^{j(\omega t + \omega_{di} t + \phi - \beta z)} \quad (23)$$

where $\omega_{di}$ is a Doppler frequency shift. A reflected version of the transmit signal $V_{reverse}$ is communicated from the reflective termination 722 in the direction 720 of the non-reflective termination 704. The reflected signal $V_{reverse}$ can generally be defined by the following mathematical equation (24).

$$V_{reverse} = -ae^{j(\omega t + \omega_{di} t + \phi + \beta z)} \quad (24)$$

The signals $V_{forward}$, $V_{reverse}$ can be sensed at a location "z" along the transmission media and subsequently used in an intermediate moving reference frame (IMRF) based process to a determine the reference signal $V_{ref}$.

The IMRF based process is substantially similar to the process described above in relation to FIG. 2. Accordingly, the IMRF based process generally involves performing an addition operation, subtraction operations, and multiplication operations. The addition operation of the IMRF based process can generally be defined by the following mathematical equation (25).

$$SM = ae^{j(\omega t + \omega_{di} t + \phi - \beta z)} - ae^{j(\omega t + \omega_{di} t + \phi + \beta z)} = -2aje^{j(\omega t + \omega_{di} t + \phi)}[\sin(\omega_{di} t + \beta z)] \quad (25)$$

where SM is a resulting signal of the addition operation of the IMRF based process.

A first subtraction operation of the IMRF based process can generally be defined by the following mathematical equation (26).

$$DIF = ae^{j(\omega t+\omega_{di}t+\phi-\beta z)} + ae^{j(\omega t+\omega_{di}t+\phi+\beta z)} = 2ae^{j(\omega t+\omega_{di}t+\phi)} [\cos(\omega_{di}t+\beta z)] \quad (26)$$

where DIF is a resulting signal of the subtraction operation of the IMRF based process.

Subsequent to completing the addition and first subtraction operation, the multiplication operations are performed. The multiplication operations of the IMRF based process can generally be defined by the following mathematical equations (27) and (28).

$$ES_S = SM^2 \quad (27)$$

$$ED_D = DIF^2 \quad (28)$$

where $ES_S$ and $ED_D$ are the resulting signals of the multiplication operations of the IMRF based process.

Once $ES_S$ and $ED_D$ are determined, then a second subtraction operation is performed. The second subtraction operation of the IMRF based process can generally be defined by the following mathematical equation (29).

$$V_{DB} = DIF^2 - SM^2 = 4a^2 e^{j2(\omega t+\omega_{di}t+\phi)}[\cos^2(\omega_{di}t+\beta z)+\sin^2(\omega_{di}t+\beta z)] = 4a^2 e^{j2(\omega t+\omega_{di}t+\phi)} \quad (29)$$

where $V_{DB}$ is a resulting signal of the second subtraction operation of the IMRF based process. Subsequent to determining the signal $V_{DB}$, further processing can be performed for increasing or decreasing the signals $V_{DB}$ frequency. If the frequency of the signal $V_{DB}$ is reduced by half, then the resulting signal of the IMRF based process is the reference signal $V_{ref}$.

It should be noted that a transmit signal generated by the signal source 702 can be stronger than a reflected version of the transmit signal received at the non-reflective termination 704. As a result, coupling of the signals can occur making it difficult to distinguish the signals from each other. In order to resolve this signal coupling issue, the signal source 702 and the non-reflective termination 704 can be spaced apart (e.g., a few hundred yards). Alternatively or additionally, the reflective termination 722 can derive a frequency offset of a transit signal, adjust the frequency thereof utilizing the frequency offset, and communicating a reflected version of the transmit signal with the adjusted frequency to the non-reflective termination 704.

Communication System Including a Reference Signal Generator

Figure 8:
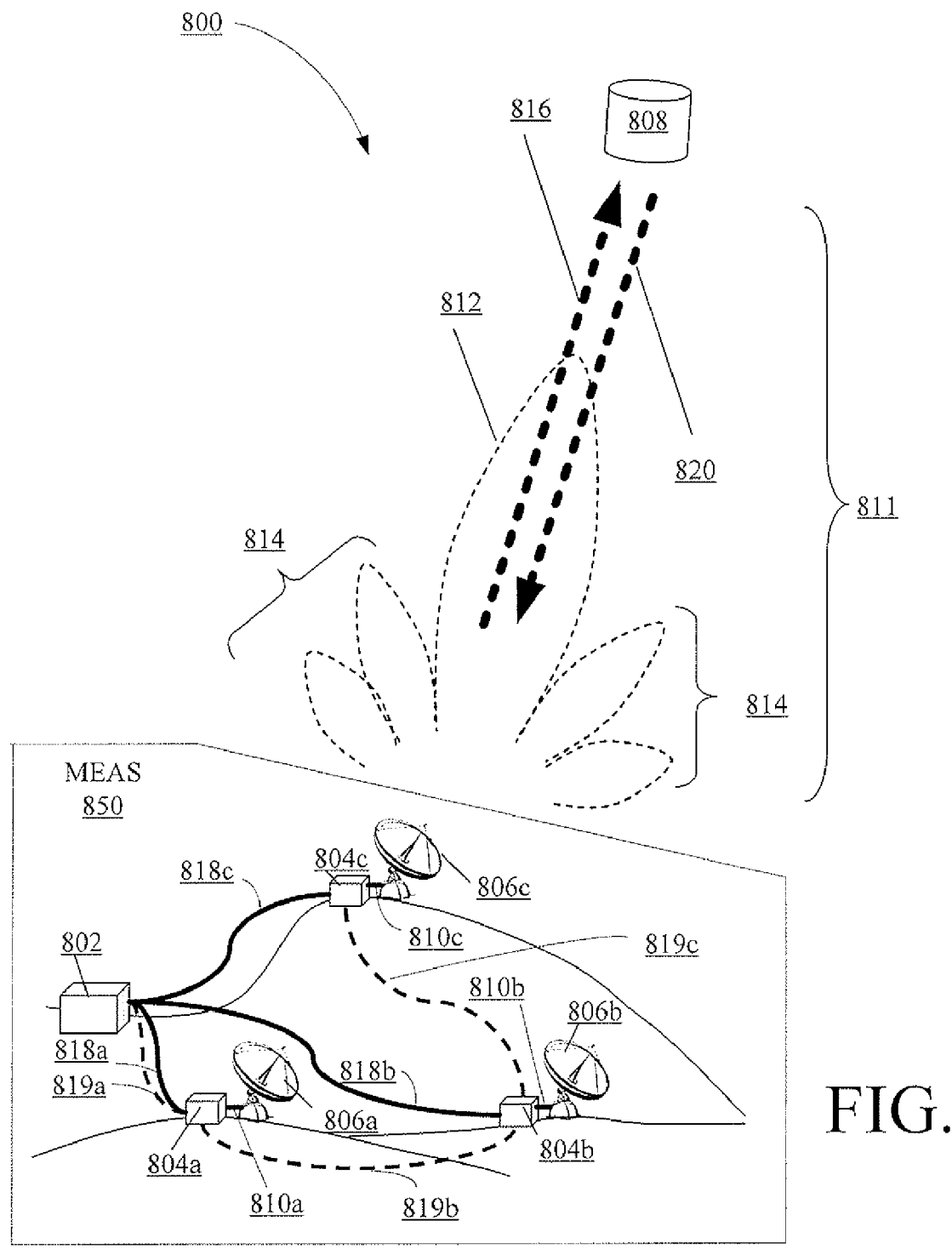
FIG. 8 is a block diagram of a communication system configured to generate reference signals.

FIG. 8 shows an exemplary communication system 800 implementing the present invention. As shown in FIG. 8, the communication system 800 comprises a multi-element antenna system (MEAS) 850 for transmitting signals to and receiving signals from at least one object of interest 808 remotely located from the MEAS 850. In FIG. 8, the object of interest 808 is shown as an airborne or spaceborne object, such as an aircraft, a spacecraft, a natural or artificial satellite, or a celestial object (e.g., a planet, a moon, an asteroid, a comet, etc . . . ). However, embodiments of the present invention are not limited in this regard. The MEAS 850 can also be used for transmitting and receiving signals from objects of interest 808 that are not airborne or spaceborne but are still remotely located with respect to MEAS 850. For example, a ground-based MEAS 850 can be used to provide communications with objects of interest 808 at other ground-based or sea-based locations. The MEAS 850 can generally include an array control system (ACS) 802 for controlling the operation of multiple antenna elements 806a, 806b, 806c.

In FIG. 8, the ACS 802 is shown as controlling the operation of antenna elements 806a, 806b, 806c and associated RF equipment 804a, 804b, 804c. The antenna elements 806a, 806b, 806c provide wireless communications. For example, if the MEAS 850 is in a transmit mode, then each antenna element 806a, 806b, 806c converts electrical signals into electromagnetic waves. The radiation pattern 811 resulting from the interference of the electromagnetic waves transmitted by the different antenna elements 806a, 806b, 806c can then be adjusted to a central beam 812 in the radiation pattern 811 aimed in the direction 816 of the object of interest 808. The radiation pattern 811 of the antenna elements 806a, 806b, 806c also generates smaller side beams (or side lobes) 814 pointing in other directions with respect to the direction of the central beam 812. However, because of the relative difference in magnitude between the side beams 814 and the central beam 812, the radiation pattern 811 preferentially transmits the signal in the direction of the central beam 812. Therefore, by varying the phases and the amplitudes of the signals transmitted by each antenna element 806a, 806b, 806c, the magnitude and direction of the central beam 812 can be adjusted. If the MEAS 850 is in a receive mode, then each of the antenna elements 806a, 806b, 806c captures energy from passing waves propagated over transmission media (not shown) in the direction 820 and converts the captured energy to electrical signals. In the receive mode, the MEAS 850 can be configured to combine the electrical signals according to the radiation pattern 811 to improve reception from direction 820, as described below.

In FIG. 8, the antenna elements 806a, 806b, 806c are shown as reflector-type (e.g., a dish) antenna elements, which generally allow adjustment of azimuth (or rotation) and elevation (angle with respect to a ground plane). Therefore, in addition to adjustment of phase and amplitude of the signal transmitted by each of the antenna elements 806a, 806b, 806c, the azimuth and elevation of each antenna element 806a, 806b, 806c can also be used to further steer the central beam 812 and adjust the radiation pattern 811. However, embodiments of the present invention are not limited on this regard. The antenna elements 806a, 806b, 806c can comprise directional or omni-directional antenna elements.

Although three (3) antenna elements 806a, 806b, 806c are shown in FIG. 8, the various embodiments of the present invention are not limited in this regard. Any number of antenna elements 806a, 806b, 806c can be used without limitation. Furthermore, the spacing between the antenna elements 806a, 806b, 806c with respect to each other is not limited. Accordingly, the antenna elements 806a, 806b, 806c can be widely spaced or closely spaced. However, as the spacing between the antenna elements 806a, 806b, 806c increases, the central beam 812 generally becomes narrower and the side beams (or side lobes) 814 generally become larger. The antenna elements 806a, 806b, 806c can also be regularly spaced (not shown) with respect to one another or arbitrarily spaced (or non-linearly spaced) with respect to one another (as shown in FIG. 8) to form a three dimensional (3D) array of antenna elements. As shown in FIG. 8, the arbitrary spacing of the antenna elements 806a, 806b, 806c can include locations having different altitudes and locations having different distances between each other.

As shown in FIG. 8, each of the antenna elements 806a, 806b, 806c is communicatively coupled to a respective RF equipment 804a, 804b, 804c via a respective cable assembly 810a, 810b, 810c (collectively 810). Each of the cable assemblies 810a, 810b, 810c can have the same or different lengths. As used herein, the phrase "cable assemblies" refers to any number of cables provided or interconnecting two different components. In the various embodiments of the present invention, the cables in the cable assemblies 810a, 810b, 810c can be bundled or unbundled.

Notably, the cables 810a, 810b, 810c can delay transmit signals. In effect, the phases of the transmit signals can be shifted thereby resulting in phasing errors. As such, the communication system 800 implements a closed loop method to counteract phasing errors due to cable delay effects. The closed loop method will become more evident as the discussion progresses.

The RF equipment 804a, 804b, 804c control the antenna elements 806a, 806b, 806c, respectively. For example, for the directional antenna elements 806a, 806b, 806c shown in FIG. 8, the RF equipment 804a, 804b, 804c can be configured to control antenna motors (not shown), antenna servo motors (not shown), and antenna rotators (not shown). The RF equipment 804a, 804b, 804c can also include hardware entities for processing transmit signals and receive signals. Notably, the phases of transmit signals can be shifted as a result of environmental effects on the cabling, antenna, and/or RF equipment 804a, 804b, 804c. These phase shifts can result in the steering of the radiated central beam 812 in a direction other than the direction 816 of the object of interest 808. The RF equipment 804a, 804b, 804c will be described in more detail below in relation to FIG. 9.

As shown in FIG. 8, each of the RF equipment 804a, 804b, 804c is communicatively coupled to the ACS 802 via a respective communications link 818a, 818b, 818c. Generally, such communications links are provided via a cable assembly. However, embodiments of the present invention are not limited in this regard. In the various embodiments of the present invention, the communications links 818a, 818b, 818c can comprise wireline, optical, or wireless communication links. The cable assemblies for the communications links 818a, 818b, 818c can have the same or different lengths. Although the communications links 818a, 818b, 818c are shown to couple the RF equipment 804a, 804b, 804c to the ACS 802 in parallel, embodiments of the present invention are not limited in this regard. The RF equipment 804a, 804b, 804c can also be coupled to the ACS 802 in a series arrangement, such as that shown by communication links 819a, 819b, 819c.

Notably, the cable assemblies of the communication links 818a, 818b, 818c, 819a, 819b, 819c can delay transmit signals. In effect, the phases of the transmit signals can be shifted thereby resulting in phasing errors. Additionally, the RF electronic components 804a, 804b, 804c used in the antennas (such as power amplifiers, filters and feed horns) may also introduce phase errors. All these errors are further subject to changes in phase due to operating environment and signal levels. As such, the communication system 800 implements a closed loop method to counteract phasing errors due to imperfect phase matching. The closed loop method will become more evident as the discussion progresses.

In operation, the ACS 802 modulates signals to be transmitted by the antenna elements 806a, 806b, 806c. The ACS 802 also demodulates signals received from other antenna systems. The ACS 802 further controls beam steering. Notably, the interconnecting cables, antenna elements 806a, 806b, 806c, and RF equipment 804a, 804b, 804c can be affected by surrounding environmental conditions (e.g., heat). Such phase shifts can result in the steering of the radiated central beam 812 in a direction other than the direction 816 of the object of interest 808. As such, the communication system 800 implements a closed loop method to counteract phasing errors due to environmental effects on ACS 802. The closed loop method will become more evident as the discussion progresses. The ACS 802 will be described in more detail below in relation to FIG. 9.

In view of the forgoing, it should be appreciated that the cables 810a, 810b, 810c and the communications links 818a, 818b, 818c (or 819a, 819b, 819c) of the communication system 800 delay signals between the ACS 802 and the antenna elements 806a, 806b, 806c. In effect, the phases of the signals are shifted thereby resulting in phasing errors. Such errors are exacerbated by the spacing between the antenna elements 806a, 806b, 806c. Phasing errors further occur as a result of environmental effects on the hardware components 802, 804a, 804b, 804c of the communication system 800. The accumulated phasing errors inhibit desirable or adequate beam formation, i.e., the accumulated phasing errors can result in the steering of the radiated central beam 812 in a direction other than the direction 816 of the object of interest 808.

Accordingly, the communication system 800 is configured to adjust the phases and/or amplitudes of signals transmitted from and received at each antenna element 806a, 806b, 806c so as to counteract the errors in phasing. The phases and/or amplitudes of the transmit and receive signals can be adjusted using a reference signal $V_{ref}$. This phase and/amplitude adjustment function of the communication system 800 will become more evident as the discussion progresses.

Figure 9:
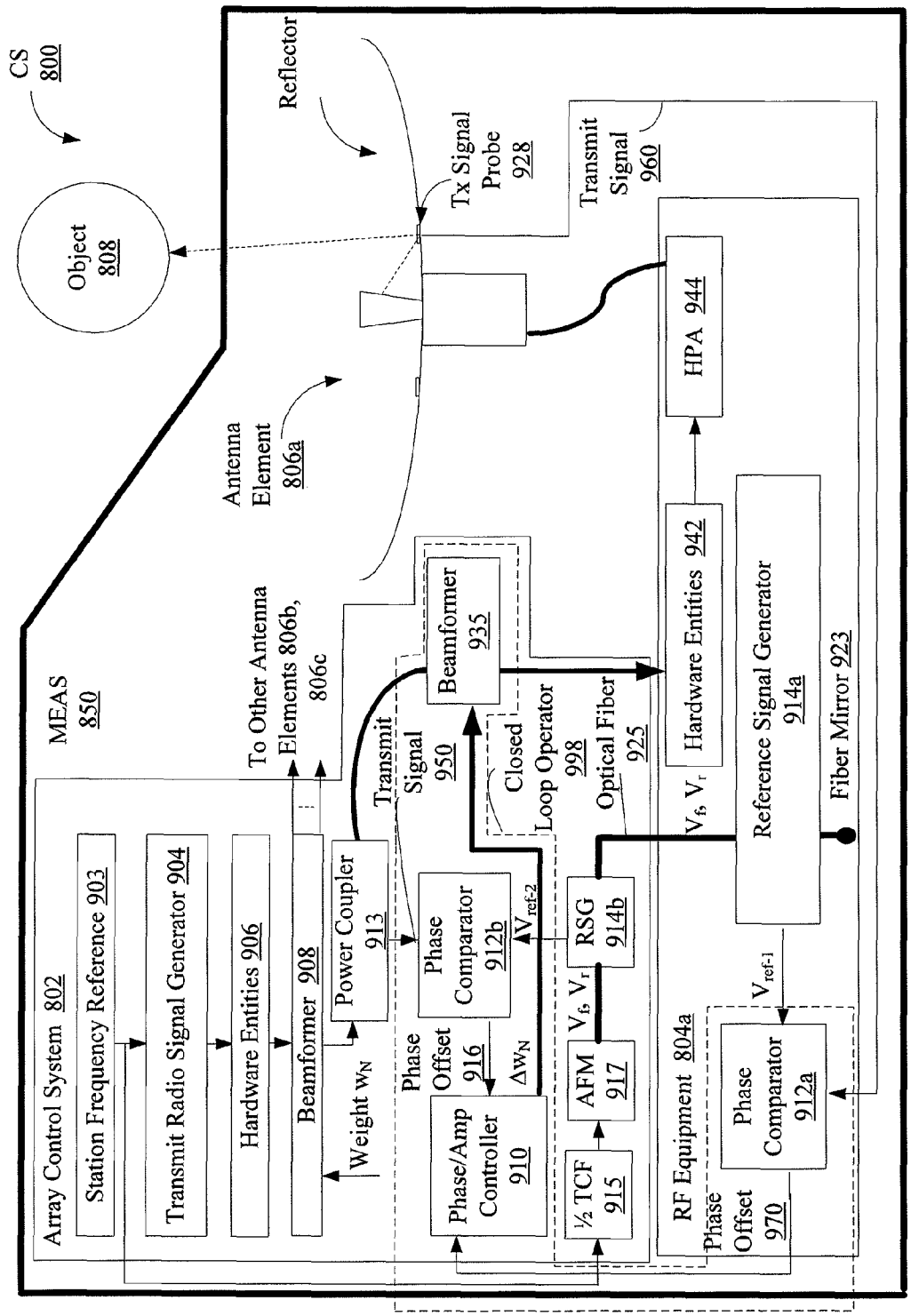
FIG. 9 is more detailed block diagram of the communication system of FIG. 8.

Referring now to FIG. 9, there is provided a more detailed block diagram of the communication system 800 that is useful for understanding the phase and/or amplitude adjustment function thereof. Notably, the antenna elements 806a, 806c and RF equipment 804b, 804c are not shown in FIG. 9 to simplify the following discussion. However, it should be understood that the antenna elements 806b, 806c are the same as or substantially similar to the antenna element 806a. Similarly, the RF equipment 804b, 804c is the same as or substantially similar to the RF equipment 804a.

As shown in FIG. 9, the ACS 802 comprises a station frequency reference 903, a Transmit Radio Signal Generator (TRSG) 904, hardware entities 906, beamformers 908, 935, a power coupler 913, a phase/amplitude controller 910, a phase comparator 912b, and a reference signal generator 914b. Embodiments of the present invention are not limited in this regard. For example, the ACS 802 can include a set of components 906, 908, 910, 912b, 913, 914b, and 935 for each antenna element 806a, 806b, 806c. As also shown in FIG. 9, the RF equipment 804a comprises hardware entities 942, a high power amplifier (HPA) 944, a phase comparator 912a, and a reference signal generator 914a. Embodiments of the present invention are not limited in this regard. For example, the RF equipment 804a can be absent of hardware entities 942. As also shown in FIG. 9, the MEAS 850 comprises a ½ transmit carrier frequency device 915, an analog fiber modulator 917, an optical fiber 925, and a fiber mirror 923.

The TRSG 904 of the ACS 802 can generate signals to be transmitted from the antenna elements 806a, 806b (not shown), 806c (not shown). The TRSG 904 is communicatively coupled to the station frequency reference 903 and the hardware entities 906. The phrase "hardware entities", as used herein, refers to signal processing devices, including but not limited to, filters and amplifiers. The hardware entities 906 are communicatively coupled to the beamformer 908.

The beamformers 908 can be utilized to control the phases and/or the amplitudes of transmit signals. In general, the phases and/or amplitudes of the transmit signal can be used to adjust formation of the central beam 812, the side beams (or side lobes) 814, and nulls in the radiation pattern 811. Nulls correspond to directions in which destructive interference results in a transmit signal's strength that is significantly reduced with respect to the directions of the central beam 812 and the side beams 814. The beamformer 908 combines a complex weight $w_N$ with transmit signals to be provided to the RF equipment 804a, 804b (not shown), 804c (not shown).

The beamformer 908 is communicatively coupled to power coupler 913. The power coupler 913 is communicatively coupled to the closed loop operator 998. The closed loop operator 998 will be described below. However, it should be understood that the closed loop operator 998 is generally configured to adjust the phase and/or amplitude of transmit signals and communicate the phase and/or amplitude adjusted transmit signals to the hardware entities 942 of the RF equipment 804a. The hardware entities 942 are communicatively coupled to the HPA 944. HPAs are well known to those having ordinary skill in the art, and therefore will not be described herein. However, it should be understood that the HPA 944 communicates signals to the antenna element 806a for transmission therefrom.

The closed loop operator 998 is generally configured for controlling the phases and/or amplitudes of transmit signals so as to counteract phasing errors due to cable delay effects, wide antenna spacing effects, and environmental effects on hardware components 802 and 804a of the communication system 800. Accordingly, the closed loop operator 998 includes the phase comparators 912a, 912b, the phase/amplitude controller 910, and the beamformer 935.

The phase comparator 912a is configured to receive a transmit signal 960 from the antenna element 806a and a reference signal $V_{ref-1}$ from a reference signal generator 914a. In this regard, it should be understood that the antenna element 806a has a transmit (Tx) signal probe 928 disposed thereon for sensing the transmit signal 960. At the phase comparator 912a, the phase of the sensed transmit signal 960 is compared with the phase of the reference signal $V_{ref-1}$ to determine a phase offset 970. The phase offset 970 can be represented in terms of an imaginary part Q and a real part I. The phase offset 970 is then communicated from the phase comparator 912a to the phase/amplitude controller 910.

The reference signal $V_{ref-1}$ utilized by the phase comparator 912a is generated by the reference signal generator 914a. The reference signal generator 914a is configured to receive sensed signals $V_f$, $V_r$ from one or more sensor devices (not shown) disposed on the optical fiber 925 at a first location. Additionally or alternatively, the reference signal generator 914a is configured to sense signals $V_f$, $V_r$ propagated along the optical fiber 925. The sensed signals $V_f$, $V_r$ are used to determine the reference signal $V_{ref-1}$. The manner in which the reference signal $V_{ref-1}$ is determined is described above in relation to FIGS. 1-3. The reference signal generator 914a can be the same as or substantially similar to any one of the reference signal generator shown in FIGS. 4 and 5.

The phase comparator 912b is configured to receive a transmit signal 950 from the power coupler 913 and a reference signal $V_{ref-2}$ from a reference signal generator 914b. At the phase comparator 912b, the phase of the transmit signal 950 is compared with the phase of the reference signal $V_{ref-2}$ to determine a phase offset 916. The phase offset 916 can be represented in terms of an imaginary part Q and a real part I. The phase offset 916 is then communicated from the phase comparator 912b to the phase/amplitude controller 910.

The reference signal $V_{ref-2}$ utilized by the phase comparator 912b is generated by the reference signal generator 914b. The reference signal generator 914b is configured to receive sensed signals $V_f$, $V_r$ from one or more sensor devices (not shown) disposed on the optical fiber 925 at a second location different from the first location. Additionally or alternatively, the reference signal generator 914b is configured to sense signals $V_f$, $V_r$ propagated along the optical fiber 925. The sensed signals $V_f$, $V_r$ are used by the reference signal generator 914b to determine the reference signal $V_{ref-2}$. The manner in which the reference signal $V_{ref-2}$ is determined is described above in relation to FIGS. 1-3. The reference signal generator 914b can be the same as or substantially similar to any one of the reference signal generator shown in FIGS. 4 and 5. The reference signal generator 914b can also be the same as or substantially similar to the reference signal generator 914a.

The phase/amplitude controller 910 determines the phase and/or amplitude adjustment value $\Delta w_N$ that is to be used by the beamformer 935 to adjust the phase and/or amplitude of transmit signals. The phase and/or amplitude adjustment value $\Delta w_N$ is determined using the received phase offset 916, 970 values received from the phase comparators 912b, 912a, respectively.

Figure 10:
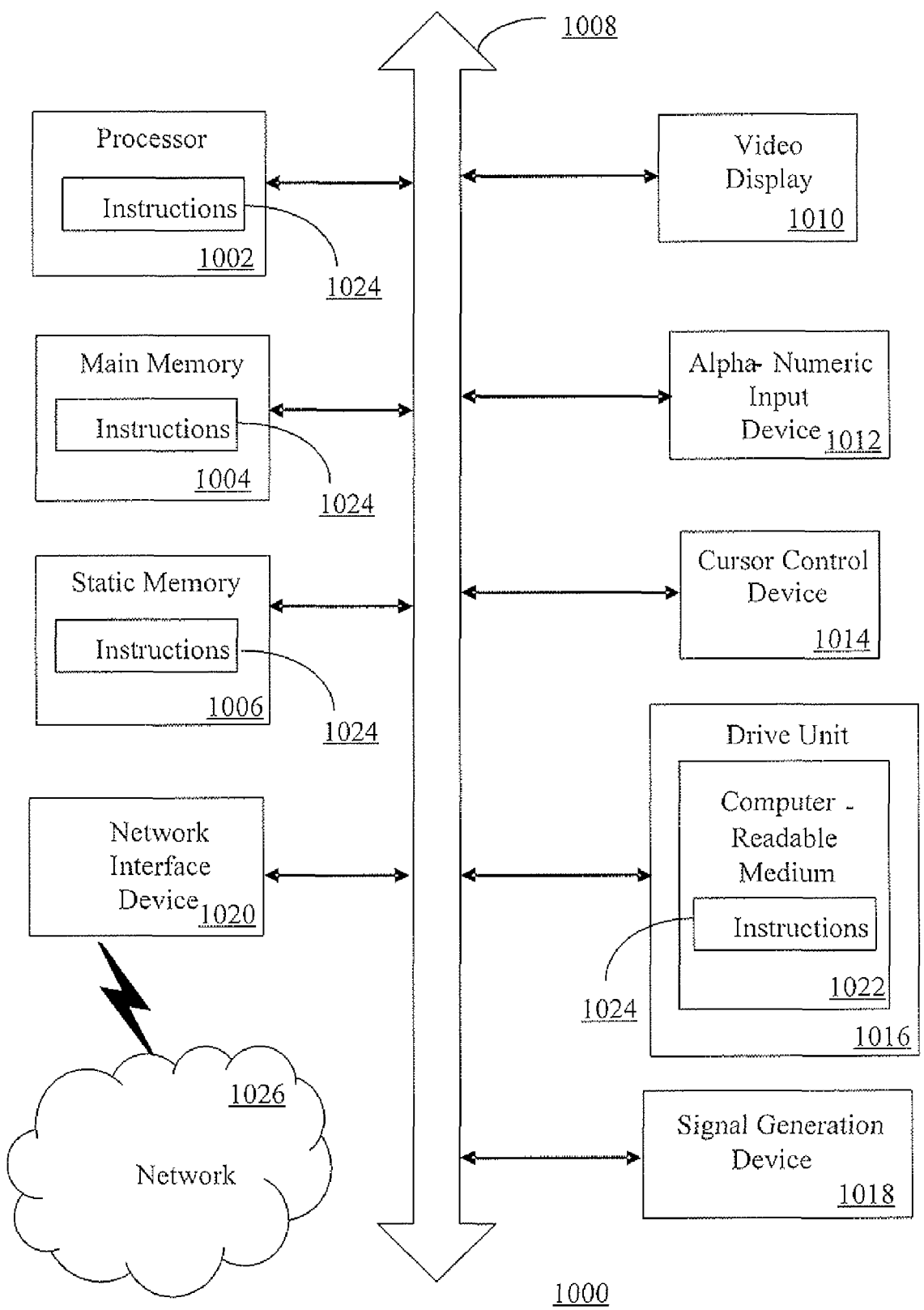
FIG. 10 is a schematic view of a computer system within which a set of instructions operate according to an embodiment of the present invention.

FIG. 10 is a schematic diagram of a computer system 1000 for executing a set of instructions that, when executed, can cause the computer system to perform one or more of the methodologies and procedures described above. For example, a computer system 1000 can be implemented to perform the various tasks of the systems 400, 500, 600, 700, 800. In some embodiments, the computer system 1000 operates as a single standalone device. In other embodiments, the computer system 1000 can be connected (e.g., using a network) to other computing devices to perform various tasks in a distributed fashion. In a networked deployment, the computer system 1000 can operate in the capacity of a server or a client developer machine in server-client developer network environment, or as a peer machine in a peer-to-peer (or distributed) network environment.

The computer system 1000 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 1000 can include a processor 1002 (such as a central processing unit (CPU), a graphics processing unit (GPU, or both), a main memory 1004 and a static memory 1006, which communicate with each other via a bus 1008. The computer system 1000 can further include a display unit 1010, such as a video display (e.g., a liquid crystal display or LCD), a flat panel, a solid state display, or a cathode ray tube (CRT)). The computer system 1000 can include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 can include a computer-readable storage medium 1022 on which is stored one or more sets of instructions 1024 (e.g., software code) configured to implement one or more of the methodologies, procedures, or functions described herein. The instructions 1024 can also reside, completely or at least partially, within the main memory 1004, the static memory 1006, and/or within the processor 1002 during execution thereof by the computer system 1000.

The main memory 1004 and the processor 1002 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 1024 or that receives and executes instructions 1024 from a propagated signal so that a device connected to a network environment 1026 can send or receive voice and/or video data, and that can communicate over the network 1026 using the instructions 1024. The instructions 1024 can further be transmitted or received over a network 1026 via the network interface device 1020.

While the computer-readable storage medium 1022 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

In light of the forgoing description of the invention, it should be recognized that the present invention can be realized in hardware, software, or a combination of hardware and software. A method for determining a reference signal according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

Applicants present certain theoretical aspects above that are believed to be accurate that appear to explain observations made regarding embodiments of the present invention. However, embodiments of the present invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others having ordinary skill in the art upon the reading and understanding of this specification and the annexed drawings. In addition, while a particular feature of the present invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. A method for utilizing at least one reference signal in an antenna system, said reference signal determined at any location along a transmission media, comprising the steps of:
sensing at a first location along the transmission media a first signal propagated over the transmission media in a forward direction and a second signal propagated over the transmission media in a reverse direction opposed from the forward direction, the second signal being a reflected version of the first signal;
adjusting a gain of at least one of the first and second signals so that the first and second signals have equal arbitrarily defined amplitudes;
determining a first sum signal by adding the first and second signals together and a first difference signal by subtracting the second signal from the first signal;
determining a first exponentiation signal by raising the first sum signal to a second power and a second exponentiation signal by raising the first difference signal to the second power;
determining a first reference signal by subtracting the first exponentiation signal from the second exponentiation signal;
performing closed loop operations using the first reference signal to determine at least one weight useful for controlling beam steering of the antenna system; and
controlling beam steering of the antenna system by using the weight to modify a transmit signal, whereby beam steering errors caused by an error in a phase of the transmit signal are counteracted.

2. The method according to claim 1, further comprising increasing or decreasing a first frequency of the first reference signal by a certain amount.

3. The method according to claim 1, wherein the first reference signal has a first frequency different than a second frequency of the first signal.

4. The method according to claim 3, further comprising the step of processing the first reference signal to obtain an adjusted reference signal with a third frequency equal to the second frequency of the first signal.

5. The method according to claim 1, further comprising the steps of:
sensing at a second location different from the first location along the transmission media the first and second signal; and
determining a second reference signal using the first and second signals sensed at the second location;
wherein the second reference signal has the same phase as the first reference signal.

6. The method according to claim 5, wherein the step of determining a second reference signal comprises
determining a second sum signal by adding the first and second signals sensed at the second location together and a second difference signal by subtracting the second signal sensed at the second location from the first signal sensed at the second location,
determining a third exponentiation signal by raising the second sum signal to the second power and a fourth exponentiation signal by raising the second difference signal to the second power, and
determining the second reference signal by subtracting the third exponentiation signal from the fourth exponentiation signal.

7. The method according to claim 5, wherein the closed loop operations further comprise using the second reference signal to determine the weight.

8. The method according to claim 5, wherein the closed loop operations further comprise comparing a phase of the transmit signal with a phase of the first reference signal to determine a phase offset.

9. The method according to claim 1, further comprising communicating the first signal from a signal source to a reflective termination over the transmission media, and communicating said second signal from the reflective termination to a non-reflective termination over the transmission media, said reflective termination moving relative signal source.

10. A method for utilizing at least one reference signal in an antenna system, said reference signal determined at any location along a transmission media, comprising the steps of:
sensing at a first location along the transmission media a first signal propagated over the transmission media in a forward direction and a second signal propagated over the transmission media in a reverse direction opposed from the forward direction, the second signal being a reflected version of the first signal;
sensing at a second location different from the first location along the transmission media the first and second signals;
adjusting a gain of at least one of the first and second signals so that the first and second signals have equal arbitrarily defined amplitudes;
determining a first sum signal by adding the first and second signals sensed at the first location together and a first difference signal by subtracting the second signal sensed at the first location from the first signal sensed at the first location;
determining a first exponentiation signal by raising the first sum signal to a second power and a second exponentiation signal by raising the first difference signal to the second power;
determining a first reference signal by subtracting the first exponentiation signal from the second exponentiation signal;
determining a second reference signal using the first and second signals sensed at the second location;
performing closed loop operations using the first reference signal and the second reference signal to determine at least one weight useful for controlling beam steering of the antenna system; and
controlling beam steering of the antenna system by using the weight to modify a transmit signal, whereby beam steering errors caused by an error in a phase of the transmit signal are counteracted;
wherein the second reference signal has the same phase as the first reference signal.

11. The method according to claim 10, wherein the first reference signal has a first frequency equal to a second frequency of the first signal.

12. The method according to claim 10, wherein the first reference signal has a first frequency different than a second frequency of the first signal.

13. The method according to claim 12, further comprising the step of processing the first reference signal to obtain an adjusted reference signal with a third frequency equal to the second frequency of the first signal.

14. The method according to claim 10, wherein the step of determining the second reference signal comprises
determining a second sum signal by adding the first and second signals sensed at the second location together and a second difference signal by subtracting the second signal sensed at the second location from the first signal sensed at the second location, determining a third exponentiation signal by raising the second sum signal to the second power and a fourth exponentiation signal by raising the second difference signal to the second power, and subtracting the third exponentiation signal from the fourth exponentiation signal to obtain the second reference signal.

15. The method according to claim 14, further comprises the step of processing the second reference signal to obtain an adjusted reference signal with a first frequency equal to a second frequency of the first signal.

16. A method for utilizing at least one reference signal in an antenna system, said reference signal determined at any location along a transmission media, comprising the steps of:

sensing at a first location along the transmission media a first signal propagated over the transmission media in a forward direction and a second signal propagated over the transmission media in a reverse direction opposed from the forward direction, the second signal being a reflected version of the first signal;

adjusting a gain of at least one of the first and second signals so that the first and second signals have equal arbitrarily defined amplitudes;

determining a first sum signal by adding the first and second signals together and a first difference signal by subtracting the second signal from the first signal;

determining a first exponentiation signal by raising the first sum signal to a second power and a second exponentiation signal by raising the first difference signal to the second power;

determining a first reference signal by subtracting the first exponentiation signal from the second exponentiation signal;

performing closed loop operations using the first reference signal to determine at least one weight useful for controlling beam steering of the antenna system; and using the weight to adjust the phase or amplitude of a communication signal so as to counteract beam steering errors caused by an error in a phase of the communication signal.

17. The method according to claim 16, wherein the first reference signal has a first frequency equal to a second frequency of the first signal.

18. The method according to claim 16, wherein the first reference signal has a first frequency different than a second frequency of the first signal.

19. The method according to claim 18, further comprising the step of processing the first reference signal to obtain an adjusted reference signal with a third frequency equal to the second frequency of the first signal.

20. The method according to claim 18, further comprising the steps of:

sensing at a second location different from the first location along the transmission media the first and second signal; and determining a second reference signal using the first and second signals sensed at the second location;

wherein the second reference signal has the same phase as the first reference signal.

* * * * *